United States Patent
Bilgic et al.

(10) Patent No.: US 8,955,390 B2
(45) Date of Patent: Feb. 17, 2015

(54) VORTEX FLOW METER

(71) Applicant: Krohne Messtechnik GmbH, Duisburg (DE)

(72) Inventors: Attila Bilgic, Ratingen (DE); Michael Deilmann, Essen (DE); Michael Gerding, Bochum (DE); Thomas Musch, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 113 days.

(21) Appl. No.: 13/674,575

(22) Filed: Nov. 12, 2012

(65) Prior Publication Data

US 2014/0041460 A1    Feb. 13, 2014

(30) Foreign Application Priority Data

Aug. 13, 2012  (DE) .......................... 10 2012 015 887

(51) Int. Cl.
*G01F 1/32*    (2006.01)

(52) U.S. Cl.
CPC ............ *G01F 1/3209* (2013.01); *G01F 1/3263* (2013.01)
USPC ..................................................... 73/861.24

(58) Field of Classification Search
USPC ................ 73/861.24, 861.25, 861.21, 861.22
See application file for complete search history.

(56) References Cited

U.S. PATENT DOCUMENTS

| | | | |
|---|---|---|---|
| 3,719,073 A * | 3/1973 | Mahon ........................ | 73/861.22 |
| 3,823,610 A | 7/1974 | Fussell, Jr. | |
| 4,181,020 A | 1/1980 | Herzl | |
| 4,358,678 A | 11/1982 | Lawrence | |
| 4,520,678 A * | 6/1985 | Koziol et al. ............... | 73/861.24 |
| 4,627,295 A * | 12/1986 | Matsubara et al. ........ | 73/861.24 |
| 4,703,659 A * | 11/1987 | Lew et al. .................. | 73/861.24 |
| 4,735,094 A | 4/1988 | Marsh | |
| 4,831,883 A | 5/1989 | Kamenster | |
| 5,060,522 A * | 10/1991 | Lew ........................... | 73/861.02 |
| 5,121,658 A * | 6/1992 | Lew ................................ | 73/195 |
| 5,197,336 A * | 3/1993 | Tsuruoka et al. ........... | 73/861.24 |
| 6,276,218 B1 * | 8/2001 | Waers ......................... | 73/861.22 |
| 6,988,418 B2 * | 1/2006 | Koudal et al. .............. | 73/861.22 |
| 7,409,872 B2 * | 8/2008 | Ishikawa et al. ........... | 73/861.22 |
| 7,770,469 B2 | 8/2010 | Nyfors et al. | |
| 8,578,786 B2 | 11/2013 | Hertel et al. | |

FOREIGN PATENT DOCUMENTS

| | | |
|---|---|---|
| EP | 0 547 577 A1 | 6/1993 |
| GB | 1 411 246 | 10/1975 |
| GB | 2 145 818 A | 4/1985 |
| WO | 9201208 | 1/1992 |
| WO | 2010/115883 A1 | 10/2010 |

\* cited by examiner

*Primary Examiner* — Jewel V Thompson

(74) *Attorney, Agent, or Firm* — Roberts Mlotkowski Safran & Cole, P.C.; David S. Safran

(57) ABSTRACT

A vortex flow meter (1) with a measurement tube (2) through which a medium can flow, a baffle body (3) for generating vortices in the medium and a deflection body (4) which can be deflected by the pressure fluctuations which accompany the vortices in the medium. The vortex flow meter seeks to avoid the disadvantages of the implementations of the measurement principle of the prior art there being an electronic unit (6) which exposes the deflection body (4) to electromagnetic radiation and receives electromagnetic radiation from the deflection body (4).

10 Claims, 4 Drawing Sheets

VORTEX FLOW METER

BACKGROUND OF THE INVENTION

1. Field of the Invention

The invention relates to a vortex flow meter with a measurement tube through which a medium can flow, with at least one baffle body for generating vortices in the medium and with at least one deflection body which can be deflected at least following pressure fluctuations which accompany the vortices in the medium.

2. Description of Related Art

The measurement principle of vortex flow meters is based on the fact that a so-called Karman vortex street can arise in a liquid or gaseous medium behind a baffle body around which the medium flows and is formed by a vortex which is detached from the baffle body and which advances with the flow. The frequency with which the vortices detach from the baffle body is dependent on the flow velocity, this relationship being almost linear under certain assumptions. Via measurement of the vortex frequency, therefore, the flow velocity of the medium can be determined, as a result of which the volumetric flow rate and mass flow rate can be determined with additional consideration of the pressure and temperature of the medium, for example.

For measuring the vortex frequency, a deflection body has been preferably used in the prior art. The vortices of the medium which occur in the vortex street lead to local pressure fluctuations which act on the deflection body and are detected by it. The deflection body can be a pressure transducer which is implemented, for example, with piezoelements or can be capacitive pressure sensors in which a sensor element is deflected, even if to a small extent. It is important simply that the deflection body is located in the vortex street such that the vortices produced by the baffle body at least indirectly drift past the deflection body, and thus, can be detected. To do this, the deflection body can be provided downstream behind the baffle body. In this case, the baffle body and the deflection body are made physically separate. However, the deflection body can also be the baffle body itself or can be implemented in the baffle body if, for example, in a design known from the prior art, with pressure transducers, the pressure transducers being located over or in the baffle body and the pressure fluctuations of the vortex street indirectly detected via channels in this way; in this case, the baffle bodies and deflection bodies are physically implemented in one unit.

In the methods known from the prior art for detecting the motion of the deflection body in which capacitive or inductive effects are used and in which piezoceramics are used or in which optical fibers are used for detection of the deflection, the deflection bodies must make contact with electric or optical lines. These lines in turn must be routed out of the medium-filled space through the measurement tube wall or the housing of the vortex flow meter into a medium-free space, conventionally, to evaluation electronics. The accompanying penetrations require very complex seals since, depending on the application, high pressure and/or temperature stability must be achieved (several 100 bar, several 100° C.).

Depending on the process conditions, for example, high temperatures of the measurement medium, it can also be that many types of sensors cannot be used. Thus, for example, in the case in which the temperatures of the medium are above the Curie point, piezoceramics cannot be used.

In the prior art, there are still other versions of the sensor technology for measuring the vortex frequency or the pressure fluctuations which accompany the vortices.

U.S. Pat. No. 3,823,610 discloses a vortex flow meter in which the motion of a ball as a result of pressure fluctuations is evaluated for measuring the vortex frequency.

The teaching of U.S. Pat. No. 4,181,020 consists in the proposal to provide a pivotally mounted flag, which moves as a result of pressure fluctuations, behind the baffle body. The structure in International Patent Application Publication WO 92/01208 A 1 is similar; in it, the movements of a deflection body are optically measured outside the measurement tube.

U.S. Pat. No. 7,770,469 B2 describes a differential pressure sensor for measuring the pressure fluctuations which occur as a result of vortices. In the measurement set-up, there is a microwave resonator with an elastic membrane, the membrane reacting to the pressure fluctuations such that the resonant frequency of the resonator changes.

In order to avoid the problem that the flow direction is dictated by the arrangement of the deflection body and the baffle body, U.S. Pat. No. 4,735,094 discloses an arrangement in which there is a sensor for measurement of the vortex frequency between two baffle bodies along a longitudinal axis of the measurement tube.

To increase the measurement accuracy, U.S. Pat. No. 4,831,883 proposes placing two baffle bodies with two sensors next to one another.

SUMMARY OF THE INVENTION

The primary object of this invention is, therefore, to provide a vortex flow meter which constitutes an alternative to the prior art, and preferably, seeks to avoid the disadvantages associated with implementation of the measurement principle of the prior art.

This object is achieved in the vortex flow meter underlying this invention in that there is at least one electronic unit which exposes the deflection body to electromagnetic radiation and receives electromagnetic radiation from the deflection body. The vortex flow meter in accordance with the invention has a measurement tube in which a baffle body and a deflection body are located, the flowing medium forming vortices behind the baffle body which act on the deflection body. The resulting movements of the deflection body are detected with at least one electronic unit and are available for determining the flow rate by exposing the deflection body to electromagnetic radiation directly or indirectly and receiving this radiation from the deflection body and further processing and evaluating it, preferably with respect to the flow rate. In doing so, the mechanical motion of the deflection body remains, so to speak, within the process and is scanned by the electromagnetic radiation.

In one configuration, the electromagnetic radiation used is radiation in the microwave range, therefore radiation with a frequency roughly between 1 and 300 GHz or a wavelength between 30 cm and 1 mm. In particular, it is radiation which is used ordinarily in liquid level measurement using the radar principle.

Depending on the implementation, the electromagnetic radiation can be emitted at least in part freely in the direction of the deflection body and can be received from there or the radiation can be routed via a conductor or injected into it.

The following configurations are devoted to the version in which the radiation is injected onto or into a conductor and is preferably also tapped. A guided version can also be combined, for example, with free incident radiation.

In one configuration, there is at least one line device which routes electromagnetic radiation to the deflection body and/or removes electromagnetic radiation from the deflection body. Accordingly, the electronic unit exposes the at least one line device to electromagnetic radiation and/or taps electromagnetic radiation from the at least one line device. In this configuration, the radiation is routed or injected and/or decoupled, for example, along the line device. In another configuration, a resonator is formed from the at least one line device with the deflection body, and optionally, other elements. If the deflection body is moving under the influence of the vortices, for example, the distance between the deflection body and a reference point changes; this is measured by the electromagnetic radiation. Alternatively or in addition, if a resonator is formed, likewise the resonant frequency can change over the motion; this can also be evaluated via the signals received by the electronic unit, ultimately then the detuning of the resonator is evaluated.

In one configuration, the deflection body is made essentially as a membrane so that the deflection body extends much more dramatically in one plane than in its thickness or height. Here, the membrane-like deflection body is preferably located relative to the baffle body such that the vortices act as much as possible on the larger surfaces of the membrane.

In one configuration, at least one line device runs onto the deflection body. Thus, the electromagnetic radiation is essentially directly incident on the deflection body, and therefore, the movements of the deflection body also act especially on the reflection of the radiation.

In the configuration of an alternative thereto, measurement is performed during transmission. For this purpose, at least one line device is routed partially in mechanical contact along the deflection body. Therefore, the electromagnetic radiation also runs along the deflection body and is influenced by the movements of the deflection body.

The at least one line device, in one configuration, is at least partially essentially cylindrical and is made alternatively or in addition essentially as an especially dielectric hollow conductor. In one configuration, the at least one line device is at least partially filled with a filler medium. In one configuration, the line device is made at least in part as a cylindrical (metal) tube. If the measurement tube is made of metal, and the line device and preferably also the deflection body are metallic, in one configuration, a very temperature-resistant arrangement results which can be used, for example, also for hygienic applications.

In one configuration, the at least one line device is not used as a waveguide, but it and the deflection body together, optionally in conjunction with other elements, form a resonator whose properties, for example, its resonance frequency, are dependent on the location or on the movements of the deflection body.

In one configuration, the deflection body is attached to the baffle body or is part of the baffle body. This is associated with the fact that the at least one line device is attached at least in part to the baffle body. The deflection body and the baffle body are two components which are mounted on one another or are a common component.

As one alternative to an additional element being introduced into the measurement tube via the line device, or as an addition in order to implement coupling of the line device to the outside world, one configuration calls for there to be at least one window which is at least partially permeable to electromagnetic radiation. The window is located, for example, in the wall of the measurement tube. In a supplementary configuration, there are several windows which are at least partially permeable to the electromagnetic radiation used. In one configuration, the window also has a corresponding lens. Furthermore, it is provided that the electronic unit exposes the deflection body to electromagnetic radiation through the at least one window and/or receives electromagnetic radiation from the deflection body through the at least one window. The window is consequently used for injection and decoupling of the radiation or optionally essentially only for injection or decoupling. This window is accompanied by a closed measurement tube in which, for example, thermal insulation can be implemented accordingly. Within the measurement tube, a line device can also be connected to this window.

In one configuration, the measurement takes place in a measurement chamber which is connected to the measurement tube to transfer pressure and in which the deflection body is located. This measurement chamber is located, for example, laterally on the measurement tube.

In one configuration, there are at least two line devices. By using two line devices, for example, the movements of the deflection body can be measured from two different sides. For this reason, for example, the at least two line devices are located opposite one another. If it is especially a membrane-like deflection body, the two line devices are connected, for example, to the respectively flat side, therefore to the top and to the bottom.

Furthermore, fundamentally, regardless of the type of configuration and arrangement of the line devices and optional windows, via a correlation of the measurement data, the reliability of the measurement can be increased, and especially also disruptions in the measurement can thus be identified and optionally correlated.

In one configuration, there are at least two deflection bodies behind the baffle body along a longitudinal axis of the measurement tube. In order, for example, to detect movements of the measurement tube itself, in this configuration, there are two baffle bodies in succession. In this case, accordingly, there are many line devices or windows for injection and/or decoupling of electromagnetic radiation to obtain measurement data from the deflection bodies.

In another configuration, there is at least one deflection body along a longitudinal axis of the measurement tube, and there is at least one deflection body behind the baffle body. This configuration can also be partially supplemented by the aforementioned configuration by more than one deflection body being located either in front of or behind the baffle body. By increasing the number of deflection bodies especially also a bi-directionality with reference to the flow direction can be achieved or it becomes possible to determine the flow direction proceeding from the measurement data assigned to the deflection bodies. Therefore, preferably with the deflection bodies, there are also corresponding structures, such as, for example, the line devices or windows for measuring the respective deflection as a result of the pressure difference by the vortices produced using the baffle body. Alternatively, depending on the flow direction, the deflection bodies are used at least in part also as additional baffle bodies for the respectively following deflection body.

In one configuration, there is at least one temperature sensor for determining the temperature of the medium. Alternatively or in addition, there is a pressure sensor for measuring the pressure in the measurement tube.

In particular, there is a plurality of possibilities for embodying and developing the vortex flow meter in accordance with the invention. In this respect reference is made to the following description of exemplary embodiments in conjunction with the drawings.

DETAILED DESCRIPTION OF THE INVENTION

Figure 1:
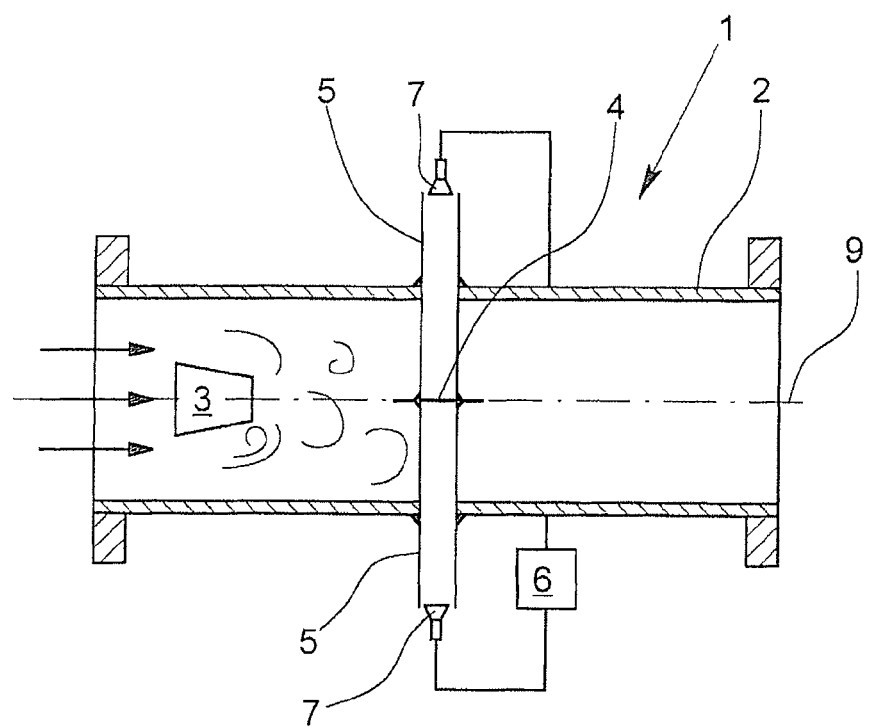
FIG. 1 is a schematic sectional view of a vortex flow meter in accordance with a first version of the invention.

FIGS. 1, 2 and 4 to 7 are sections of different exemplary embodiments of the vortex flow meters 1 in accordance with the invention. Here, the sectional plane runs such that the longitudinal axis 9 of the respective measurement tube 2 lies in the intersection plane. In the exemplary embodiments of FIGS. 3, 8 and 9, the sectional plane is perpendicular thereto and the longitudinal axis 9 is accordingly perpendicular to the plane of the drawing.

FIG. 1 shows a vortex flow meter 1 whose measurement tube 2 a flange on its ends in order, for example, to be introduced into an existing pipe system. For measuring the flow rate of the medium though the measurement tube 2 (whose direction of motion is indicated by the arrows on the side which is on the left in the drawing), there is a baffle body 3 on which vortices form by the movement of the medium. These vortices, in turn, lead to pressure fluctuations in the medium which acts on a deflection body 4, which is located in the direction of the flow of the medium, behind (downstream of) the baffle body 3, and thus, deflect it.

For an optimum measurement, the deflection body 4 is located along the longitudinal axis 9 of the measurement tube 2 at a suitable distance from the baffle body 3. The deflection body 4, which is membrane-like here, is located essentially in the plane in which the longitudinal axis 9 is located.

In the illustrated configuration, two line devices 5, which are shown in the drawing above and underneath the deflection body 4, are used for detection of the deflection or the change in location of the deflection body 4 relative to a reference point. Both line devices 5 are provided as hollow conductors for the electromagnetic radiation which is generated and received from the electronic unit 6 via the antennas 7. In one version, for measuring the deflection of the deflection body 4, essentially the radar principle is used as in the determination of a liquid level of a medium, i.e., the transit time of the radiation is determined and the distance is deduced therefrom.

Preferably, the phase angle between the emitted and returned electromagnetic radiation is alternatively determined and used for determining the distance between the transmitter/receiver of the electronic unit 6 and the deflection body, in particular, modulated electromagnetic radiation can also be used for this purpose. To do this, several proven methods are known, for example, continuous wave radar or modulated continuous wave radar.

In the illustrated configuration, the two line devices 5 also yield two measurements, and therefore, at least two sets of measurement data which are linked accordingly to one another or are optionally used for correction.

For simplification and also for clarity of the representation, there is only one electronic unit 6 here. However, alternatively, there can also be more than one electronic unit 6.

It is indicated that the measurement tube 2, the line devices 5 and the deflection body 4 each are made essentially from a metal, and therefore, are welded or soldered to one another. The line devices 5, together with the deflection body, form two gauge lengths according to the respective type of hollow conductor, the two gauge lengths being bordered by the deflection body 4 on their common junction. The deflection body 4 runs both within and also outside the cavity formed by the line device 5. At the exterior of the line device 5, the deflection body 4 is exposed to the pressure fluctuations of the medium caused by the vortices. These pressure fluctuations lead to a deformation of the deflection body 4, not only outside the line device 5, but also within the line device 5 where it then can be detected by the electromagnetic radiation or by evaluating the transit time and propagation behavior of the electromagnetic radiation. If the portion of the deflection body 4 within the line device 5 is deflected by the pressure fluctuations, the gauge length is increased, and the other gauge length is automatically diminished by the same amount such that a measurement of the movement of the deflection body 4 in push-pull is possible.

The line device 5 attached to the measurement tube 2 is used in the exemplary embodiments not only to guide the electromagnetic radiation, but it is also used to hold the deflection body 4. At the same time, a thermal decoupling relative to the electronic unit 6 is implemented.

Figure 2:
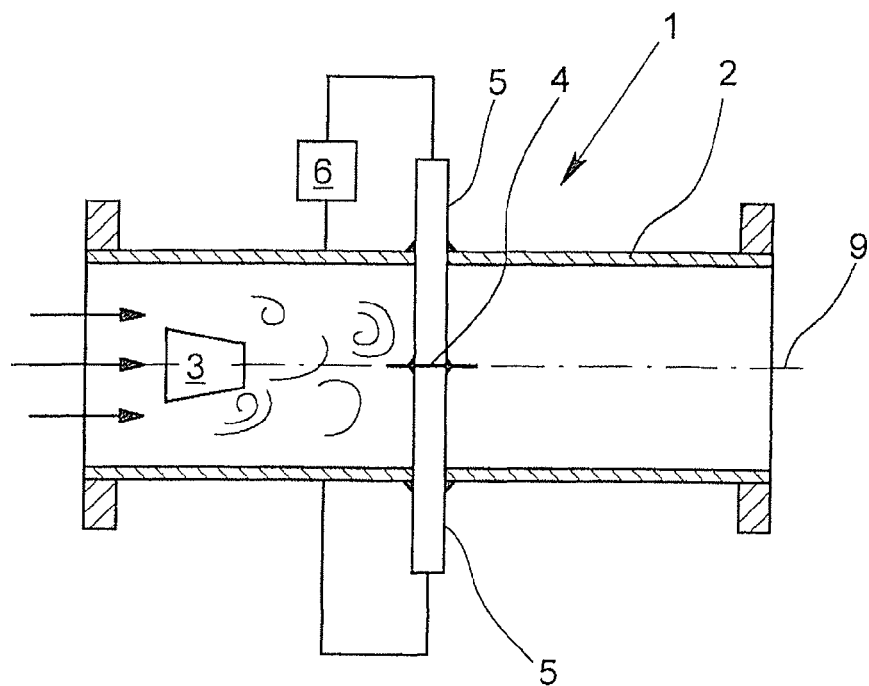
FIG. 2 is a schematic sectional view of a vortex flow meter in accordance with a second version of the invention.

The configuration of FIG. 2 differs from that of FIG. 1 in that the line devices 5 each form a resonator with the deflection body 4. Here, each of the resonators are made such that their properties (for example, the resonant frequency) are dependent on the location or orientation of the deflection body 4. This means that a movement of the deflection body 4 is, for example, expressed in there being another resonant frequency. The implemented resonators are therefore detuned when the deflection body 4 is deflected, and the frequency of the detuning can be evaluated as representing the measurement signal of actual interest. The use of one resonator or here of two resonators entails the fact that the electromagnetic radiation used is narrowband in contrast to the hollow waveguide version according to FIG. 1. In two configurations, however, the line devices 5 are mounted essentially perpendicular on the deflection body 4.

Figure 3:
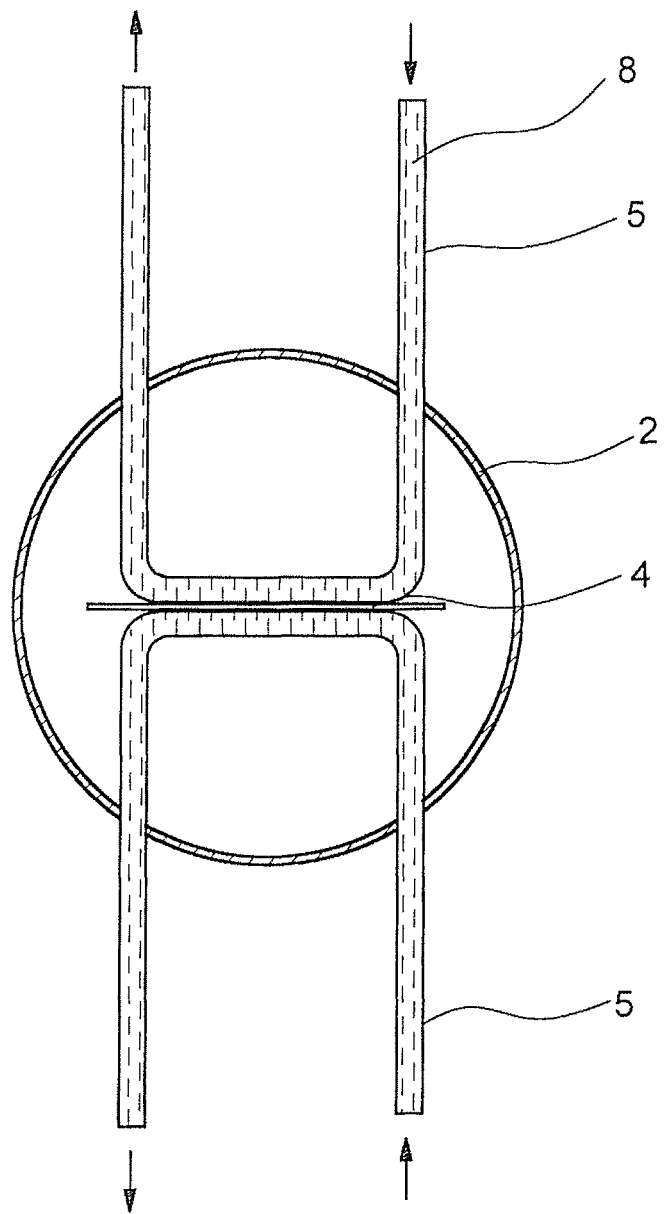
FIG. 3 is a schematic sectional view of a vortex flow meter in accordance with a third version of the invention, viewed in the direction of the longitudinal axis of the measurement tube and perpendicular to the planes of the sections of FIGS. 1 and 2.

The measurements with the configurations of FIGS. 1 and 2 are taken, essentially and in the broadest sense, using reflection. The configuration of FIG. 3 uses a type of transmission by the line device 5 by the electromagnetic radiation being routed via the two line devices 5 past the deflection body 4 (here indicated schematically by the arrows). The view of FIG. 3 runs in the direction of the longitudinal axis of the measurement tube 2. FIG. 3 is a schematic sketch. The line devices 5 and the deflection body 4 must be mechanically designed such that the pressure fluctuations produced in the measurement tube 2 by the vortices lead to sufficient deflection of the deflection body 4 and optionally of the line device 5. In this configuration, based on the transmission of electromagnetic radiation by the line device 5, the deflection body itself does not project into the measurement cavity formed by the line device 5.

The line devices 5 which are filled with a material 8 here, and thus, are not hollow, for example, in the configuration of FIG. 1, are routed essentially in a U-shape past the membrane-shaped deflection body 4 and react accordingly to the movements of the deflection body 4.

Furthermore, it can be recognized that tilting of the deflection body 4 acts in opposite directions on the measurements via the two line devices 5. Moreover, a relatively stable structure is formed, the line devices 5 or the deflection body 4 partially mutually supporting one another. In an alternative configuration, which is not shown here, there is only one line device 5 for the measurement with the electromagnetic radiation.

Figure 4:
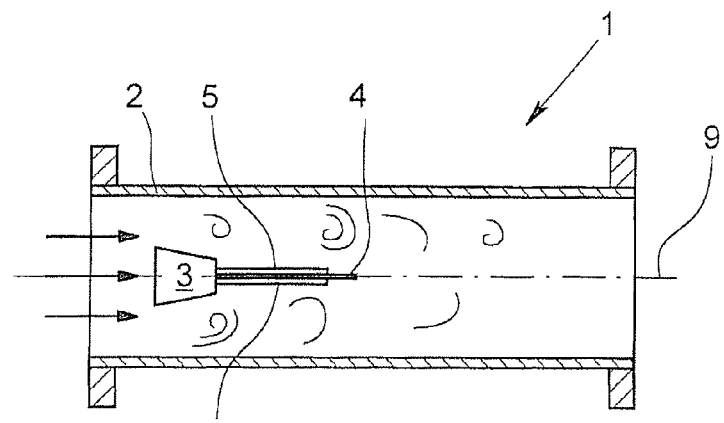
FIG. 4 is a schematic sectional view of a vortex flow meter in accordance with a fourth version of the invention, viewed in the same plane as in FIGS. 1 and 2.

In the configuration of FIG. 4, the deflection body 4 is attached directly to the baffle body 3, and thus, constitutes more or less an extension of it. Furthermore, as in the preceding configurations, there are likewise two line devices 5 which are likewise located here above and underneath the membrane-shaped deflection body 4.

The disadvantage in the successive arrangement of the baffle body 3 and the deflection body 4 is that it is linked to a special flow direction of the medium since the deflection body 4 is designed to accommodate the vortices which are being produced by the baffle body 3. Therefore, a change of the flow direction leads to measurement no longer being possible.

Figure 5:
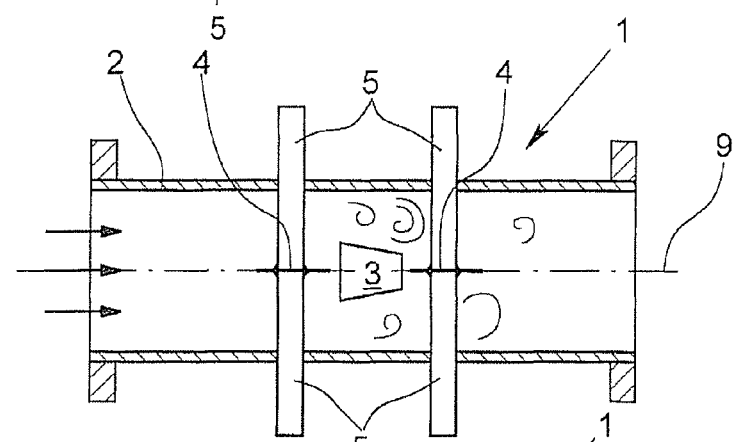
FIG. 5 is a schematic sectional view of a vortex flow meter in accordance with a fifth version of the invention.

For this problem, the configuration of FIG. 5 calls for there to be a respective deflection body 4, here with two line devices 5 each, in front of and behind the baffle body 3. This allows measurements regardless of the flow direction of the medium or makes it possible to draw conclusions about the flow direction based on the measurements. For this reason, for example, the baffle body 3 is made such that it produces the vortices necessary for the measurement for both flow directions. In the figure, the medium should flow from left to right so that the indicated vortices are also to the right of the baffle body 3.

Regardless of the determination of the flow direction or a fundamental possibility for a bidirectional measurement, the successively located measurement arrangements of deflection bodies 4 and line devices 5 also allow measurements of oscillations of the process system or perturbations in the flow of the medium.

Figure 6:
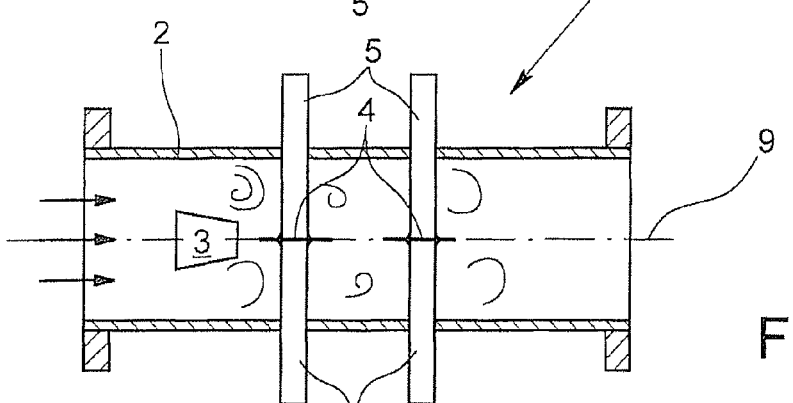
FIG. 6 is a schematic sectional view of a vortex flow meter in accordance with a sixth version of the invention.

Another arrangement which makes it possible to obtain more information by the correlation of measurement data is shown in FIG. 6 in which two deflection bodies 4 with their line devices 5 are located in the direction of the longitudinal axis 9 behind (downstream of) the baffle body 3 and both measure or record the generated vortices or pressure fluctuations.

Figure 7:
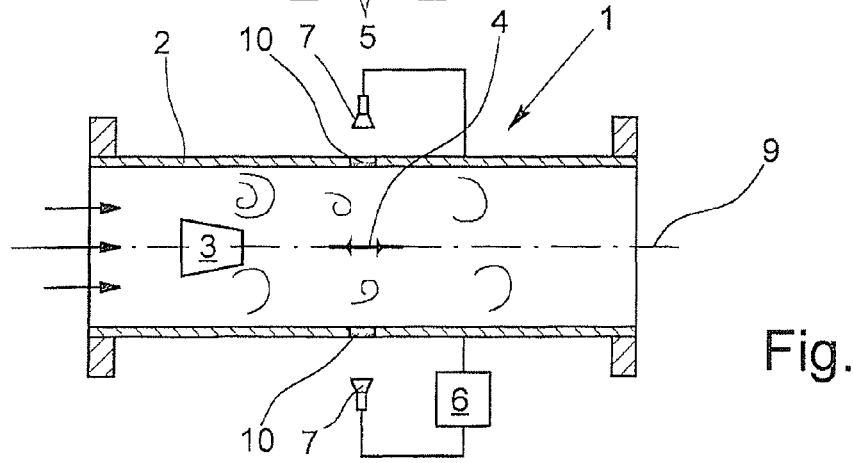
FIG. 7 is a schematic sectional view of a vortex flow meter in accordance with a seventh version of the invention.

The configuration of FIG. 7 is directed to another version in which the electromagnetic radiation of the electronic unit 6 is injected and decoupled via windows 10 in the wall of the measurement tube 2. These windows 10 are known basically in the field of liquid level measurement by means of the radar principle. Alternatively, but not shown here, one window can be combined with a line device as in the aforementioned configurations.

Figure 8:
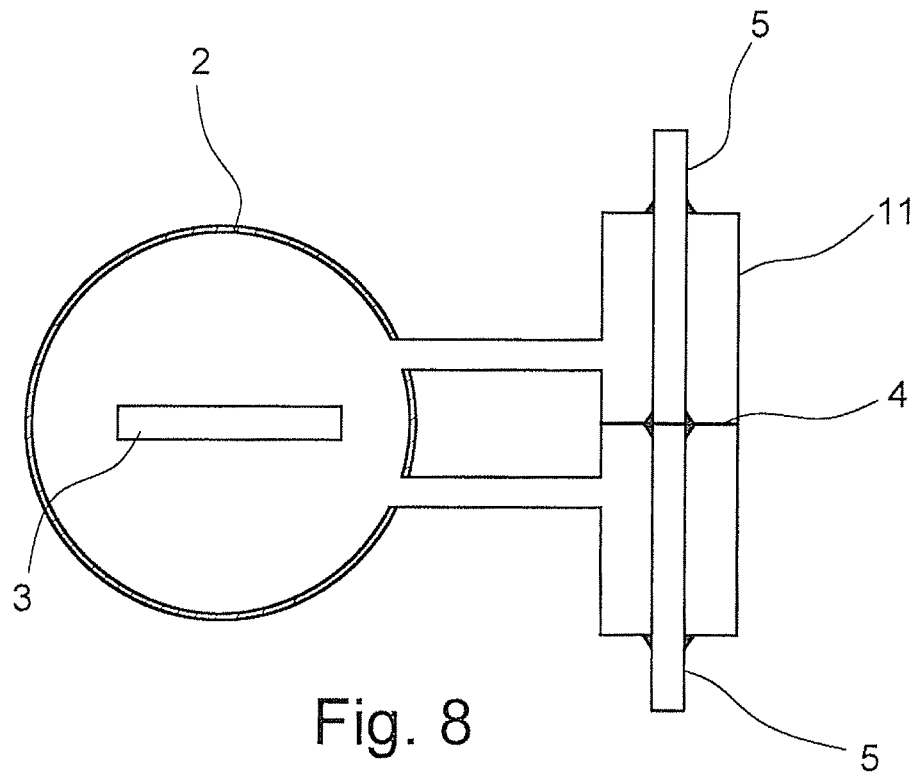
FIG. 8 is a schematic sectional view of a vortex flow meter in accordance with an eighth version, viewed in the same direction as FIG. 3, and with the measurement space located outside of the measurement tube.
Figure 9:
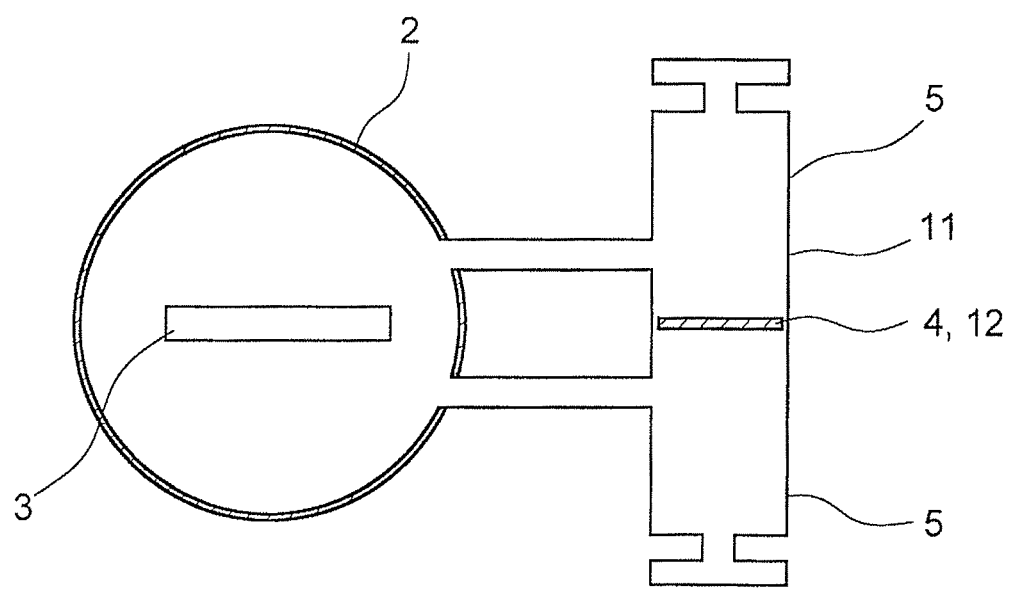
FIG. 9 is a schematic sectional view of a vortex flow meter in accordance with an ninth version, viewed in the same direction as FIG. 3, and with the measurement space located outside of the measurement tube.

FIGS. 8 and 9 show a shift of the measurement out of the measurement tube 2.

FIG. 8 shows a view in the direction of the longitudinal axis of the measurement tube 2. A measurement space 11 in which the deflection body 4 is located is connected to the measurement tube 2 via two channels which are used especially for pressure transfer. In the measurement tube 2, the baffle body 3 in the medium produces the vortices and pressure fluctuations which are measured in the measurement space 11. Here, the baffle body 3 and the measurement space 11 can be at different axial heights along the longitudinal axis of the measurement tube 2.

In the measurement space 11, the deflection body 4 is also moved; this can be measured via the electromagnetic radiation which is routed via line devices 5. A pressure which is different from the process pressure can prevail in the line devices 5.

One alternative configuration in which the measurement space 11 is closed in itself and is entirely under process pressure is shown in FIG. 9. In this configuration, the injection and decoupling of the electromagnetic signals take place, for example, via windows which are not shown here and which are located, for example, at other axial heights than the section shown here.

The deflection body 4 in this configuration also has, in addition, a temperature sensor 12 which allows the temperature of the medium to be determined.

What is claimed is:

1. A vortex flow meter, comprising:
    a measurement tube through which a medium can flow,
    at least one baffle body in the measurement tube for generating vortices in the medium,
    at least one deflection body which is deflectable at least by following pressure fluctuations which accompany the vortices in the medium,
    at least one electronic unit which exposes the deflection body to electromagnetic radiation and receives electromagnetic radiation back from the deflection body, and
    further comprising at least one line device which is adapted to at least one of route electromagnetic radiation to the deflection body and return electromagnetic radiation from the deflection body, wherein the electronic unit is adapted to at least one of expose the at least one line device to electromagnetic radiation and tap electromagnetic radiation from the at least one line device.

2. The vortex flow meter in accordance with claim 1, wherein the at least one line device runs on the deflection body.

3. The vortex flow meter in accordance with claim 1, wherein the at least one line device is routed partially in mechanical contact along the deflection body.

4. The vortex flow meter in accordance with claim 1, wherein the at least one line device and the deflection body form a resonator.

5. The vortex flow meter in accordance with claim 1, wherein the deflection body is attached to or is a part of the baffle body, and wherein the at least one line device is attached at least in part to the baffle body.

6. The vortex flow meter in accordance with claim 1, wherein there are at least two line devices, and wherein the at least two line devices are located opposite one another relative to the deflection body.

7. A vortex flow meter , comprising:
    a measurement tube through which a medium can flow,
    at least one baffle body in the measurement tube for generating vortices in the medium,
    at least one deflection body which is deflectable at least by following pressure fluctuations which accompany the vortices in the medium,
    at least one electronic unit which exposes the deflection body to electromagnetic radiation and receives electromagnetic radiation back from the deflection body, and wherein there is at least one window which is at least partially permeable to electromagnetic radiation, and wherein the electronic unit at least one of exposes the deflection body to electromagnetic radiation through the at least one window and receives electromagnetic back radiation from the deflection body through the at least one window.

8. A vortex flow meter, comprising:

a measurement tube through which a medium can flow, at least one baffle body in the measurement tube for generating vortices in the medium, at least one deflection body which is deflectable at least by following pressure fluctuations which accompany the vortices in the medium, at least one electronic unit which exposes the deflection body to electromagnetic radiation and receives electromagnetic radiation back from the deflection body, and, wherein the deflection body is located in a measurement chamber which outside of the measurement tube and is connected to the measurement tube in a manner transferring pressure from the measurement tube to the measurement chamber.

9. The vortex flow meter in accordance with claim 1, wherein the at least one deflection body comprises at least two deflection bodies provided along a longitudinal axis of the measurement tube downstream of the baffle body.

10. A vortex flow meter, comprising:

a measurement tube through which a medium can flow, at least one baffle body in the measurement tube for generating vortices in the medium, at least one deflection body which is deflectable at least by following pressure fluctuations which accompany the vortices in the medium, at least one electronic unit which exposes the deflection body to electromagnetic radiation and receives electromagnetic radiation back from the deflection body, and wherein there are at least two deflection bodies along a longitudinal axis of the measurement tube, at least one of the deflection bodies being located in front of the baffle body and at least one of the deflection bodies being located behind the baffle body.

* * * * *